(12) United States Patent
Bonnardel

(10) Patent No.: US 8,333,257 B2
(45) Date of Patent: Dec. 18, 2012

(54) OBJECT MOVEMENT SYSTEM AND METHOD

(76) Inventor: James A. Bonnardel, San Diego, CA (US)

( * ) Notice: Subject to any disclaimer, the term of this patent is extended or adjusted under 35 U.S.C. 154(b) by 188 days.

(21) Appl. No.: 12/841,907

(22) Filed: Jul. 22, 2010

(65) Prior Publication Data

US 2011/0017526 A1 Jan. 27, 2011

Related U.S. Application Data

(60) Provisional application No. 61/227,917, filed on Jul. 23, 2009.

(51) Int. Cl.
*B62D 5/04* (2006.01)
(52) U.S. Cl. ............ 180/13; 180/15; 180/19.1; 180/19.2
(58) Field of Classification Search .................... 180/13, 180/19.1–19.3, 15, 16, 904; 280/3
See application file for complete search history.

(56) References Cited

U.S. PATENT DOCUMENTS

| | | | | |
|---|---|---|---|---|
| 1,371,903 A * | 3/1921 | Kinkead et al. | ............. | 180/19.1 |
| 1,373,352 A * | 3/1921 | Rice | ................................... | 280/3 |
| 2,649,162 A * | 8/1953 | Wooldridge et al. | ........... | 180/13 |
| 2,706,008 A * | 4/1955 | Voigt | ............................ | 180/19.2 |
| 3,249,170 A * | 5/1966 | Quayle | ......................... | 180/19.2 |
| 3,387,681 A * | 6/1968 | Rabjohn | ......................... | 180/13 |
| 3,770,070 A | 11/1973 | Smith | | |
| 3,783,960 A | 1/1974 | Feliz | | |
| 3,820,617 A * | 6/1974 | Groff | ............................ | 180/19.1 |
| 3,861,482 A | 1/1975 | Stephens et al. | | |
| 4,088,202 A * | 5/1978 | Costello | .......................... | 182/13 |
| 4,662,476 A * | 5/1987 | Ross | ................................. | 182/13 |
| 4,860,841 A | 8/1989 | Sacco | | |
| 4,915,185 A * | 4/1990 | Olson | .......................... | 180/19.2 |
| 6,170,585 B1 | 1/2001 | Turner | | |
| 6,347,677 B1 | 2/2002 | Collins | | |
| 6,779,616 B1 | 8/2004 | Brown | | |
| 6,945,343 B1 | 9/2005 | Moreau et al. | | |
| 6,991,050 B1 | 1/2006 | Sanford et al. | | |
| 7,328,761 B1 | 2/2008 | Tyler | | |
| 7,451,841 B2 | 11/2008 | Nelson | | |
| 7,789,187 B2 * | 9/2010 | Zerhusen et al. | ............. | 180/323 |

* cited by examiner

*Primary Examiner* — Tashiana Adams
*Assistant Examiner* — Maurice Williams
(74) *Attorney, Agent, or Firm* — Snell & Wilmer L.L.P.

(57) ABSTRACT

Systems and methods for moving objects facilitate quick and inexpensive relocation of the target objects. Operator safety is enhanced by eliminating the need to apply manual force to urge a target object into motion, and by inclusion of features such as automatic braking responsive to motor cut-off. Through use of the present system, a user may move a target object, for example a trailer intended for use behind a vehicle, into and/or out of a storage location in a simplified and more efficient manner.

20 Claims, 11 Drawing Sheets

OBJECT MOVEMENT SYSTEM AND METHOD

CROSS REFERENCE TO RELATED APPLICATIONS

This application is a non-provisional of U.S. Provisional No. 61/227,917 filed on Jul. 23, 2009 and entitled "OBJECT MOVEMENT SYSTEM AND METHOD." This provisional application is hereby incorporated by reference in its entirety.

TECHNICAL FIELD

The present disclosure relates generally to movement of objects, and more particularly to systems and methods for moving or transporting wheeled vehicles.

BACKGROUND

Often, an object, for example a wheeled trailer, is desired to be moved, e.g., placed in and/or withdrawn from a confined space. Moreover, the design of smaller trailers can make them especially difficult to park when using a towing vehicle; generally, the shorter the trailer the more difficult it is to maneuver while reversing. Another often encountered difficulty is space limitation; the towing vehicle may have limited room and may thus be unable to maneuver in a suitable manner or even gain access to the trailer. As a result, a person may typically resort to physically pushing or pulling a trailer to move and/or position the trailer over a short distance. However, this can be difficult, for example due to the weight of the trailer, the load the trailer is carrying, the nature and/or slope of the terrain upon which the trailer is situated, and so forth. Additionally, manual trailer movement can be dangerous because a heavy trailer may be difficult to control once it is set in motion.

Certain existing devices designed to move trailers are typically built for long hours of use, for moving trailers configured to haul industrial sized loads (e.g., loads in excess of about 10,000 pounds), and/or for being permanently affixed to the trailer. Accordingly, such devices are often extremely expensive, difficult to transport, and/or cumbersome to install and remove from a trailer. It is thus desirable to provide a system for moving objects, for example a trailer mover system, which is comparatively lightweight, portable, easy to use on a variety of wheeled equipment, and/or inexpensive to manufacture.

SUMMARY

Described herein are systems and methods for vehicle movement. In an exemplary embodiment, a trailer mover system comprises a wheel coupled to a frame, the frame configured to be coupled to a trailer, and a motor coupled to the wheel via a planetary gear system. A steering handle is coupled to the frame and configured to facilitate a user steering the trailer mover system. A control box is coupled to the motor and configured to deliver operational commands to the motor.

In another exemplary embodiment, a method for moving an object comprises coupling a wheel to the tongue of a trailer, the wheel being coupled to a motor via a planetary gear system. The motor is coupled to a power source located on the trailer. At least one operational command is delivered, via a control panel coupled to the motor, to the motor to cause the motor to operate and move the trailer. Guidance is provided to the trailer while the motor is operational via use of a steering handle coupled to the wheel.

In another exemplary embodiment, a tangible computer-readable medium has stored thereon, computer-executable instructions that, if executed by a system, cause the system to perform a method. The method comprises coupling a wheel to the tongue of a trailer, the wheel being coupled to a motor via a planetary gear system, coupling the motor to a power source located on the trailer, delivering, via a control panel coupled to the motor, at least one operational command to the motor to cause the motor to operate and move the trailer, and providing guidance to the trailer while the motor is operational via use of a steering handle coupled to the wheel.

BRIEF DESCRIPTION OF THE DRAWINGS

The claimed subject matter is particularly pointed out in the concluding portion of the specification. The present disclosure, however, both as to organization and content, may best be understood by reference to the following description taken in conjunction with the accompanying drawing figures, in which like parts are referred to by like numerals:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

The subject matter may be described herein in terms of various functional components and processing steps. It should be appreciated that such components and steps may be realized by any number of mechanical, electrical, hardware, software, or other components configured to perform the specified functions. For example, an exemplary embodiment employs various electrical and mechanical components and functionality. In addition, various embodiments may be practiced in any number of object movement applications, and the embodiments disclosed are merely indicative of exemplary applications. For example, the principles, features and methods discussed may be applied to other vehicles, storage devices, transport devices, and/or the like.

For the sake of brevity, conventional techniques for welding, fastening, coupling, assembly of electrical components, and/or the like may not be described in detail herein. Furthermore, the connecting lines shown in various figures contained herein are intended to represent exemplary functional relationships and/or communicative, logical, and/or physical couplings between various elements. It should be noted that many alternative or additional functional relationships, components, and/or physical connections may be present in a practical trailer mover system. Moreover, when referring herein to moving, movement, motion, and/or the like, such terms can mean any form of movement, displacement, transporting, placing, pushing, pulling, lifting, and/or the like, and any combinations of the same.

Figure 1:
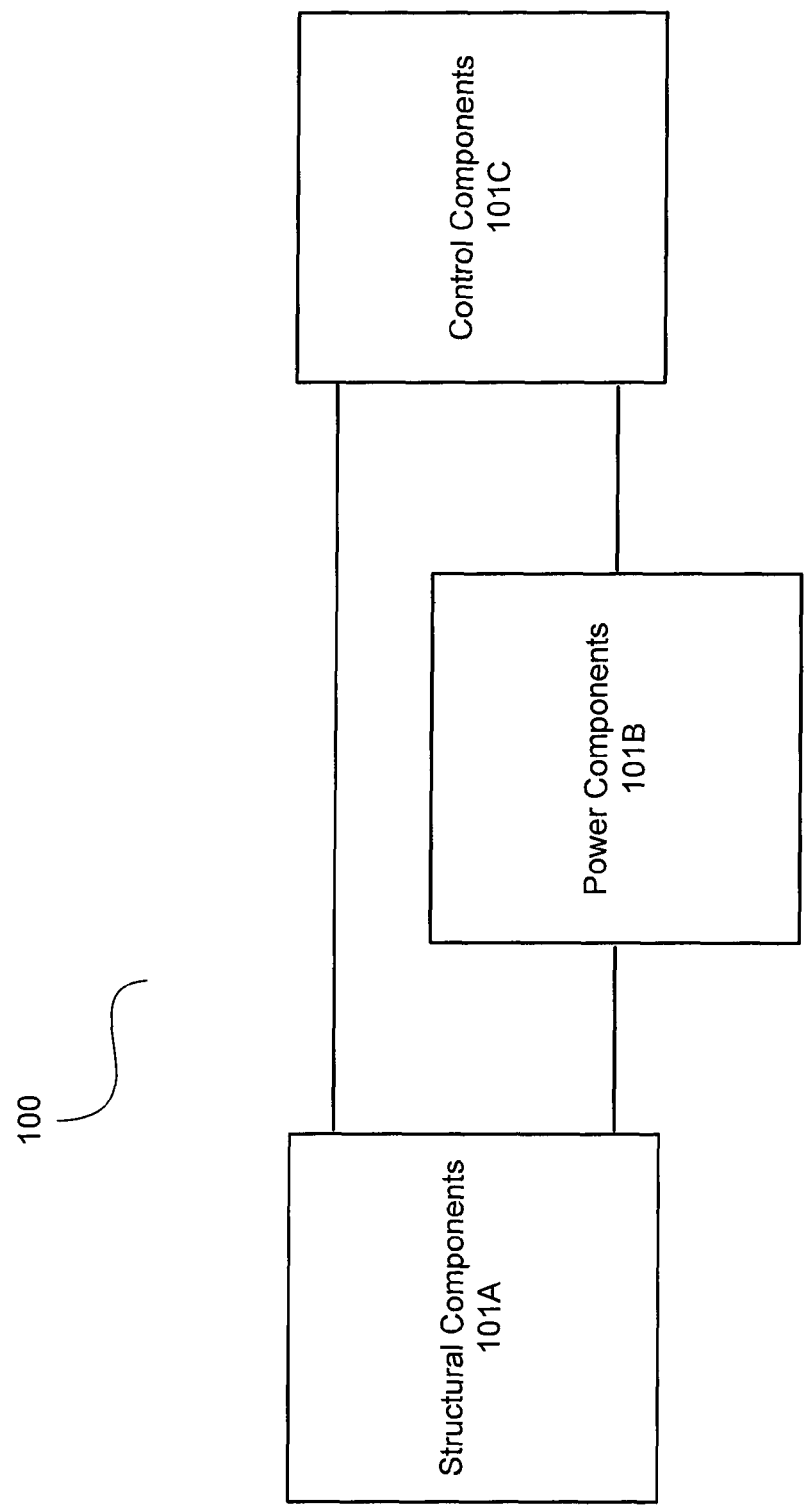
FIG. 1 illustrates a block diagram of a system for moving objects, for example a trailer mover system, in accordance with an exemplary embodiment.
Figure 2:
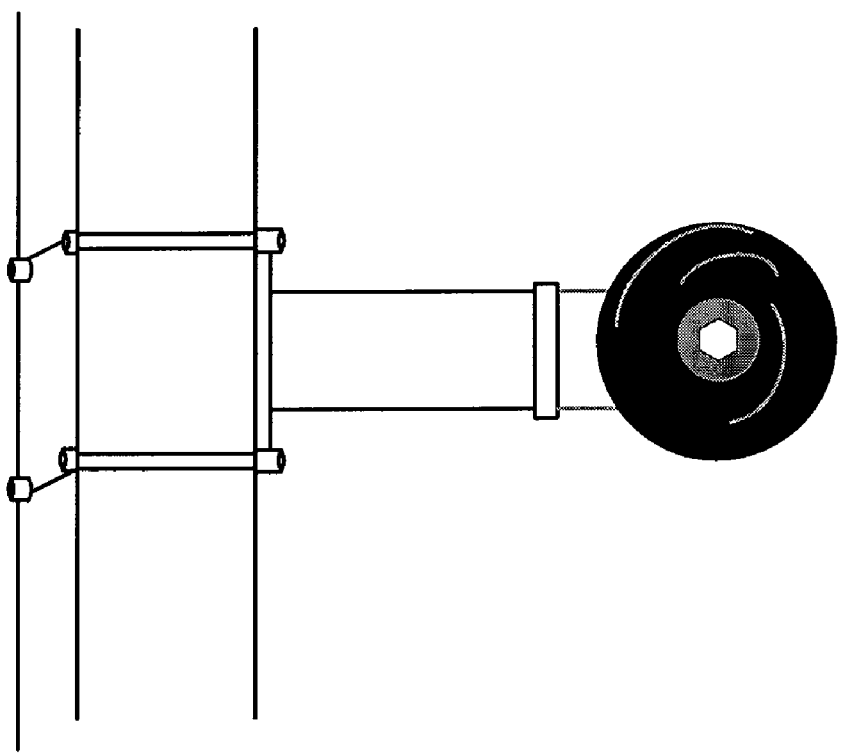
FIG. 2 illustrates portions of a trailer mover system coupled to a trailer tongue in accordance with an exemplary embodiment.

A system for moving objects, for example a trailer mover system, may comprise any components, mechanisms, devices, and/or the like, configured to facilitate movement of a desired object, for example a wheeled vehicle such as a trailer. In an exemplary embodiment, a trailer mover system is configured to retrofit onto an existing trailer stand. In another exemplary embodiment, a trailer mover system is configured to function as a trailer stand and thus may be directly attached to a trailer, for example on the trailer tongue as illustrated in FIG. 2. In accordance with an exemplary embodiment, and with reference now to FIG. 1A, a trailer mover system 100 generally comprises structural components 101A, power components 101B, and control components 101C. Structural components 101A are configured to provide support to a trailer and/or to various components of trailer mover system 100. Power components 101B are coupled to structural components 101A, and are configured to generate, transmit, and/or transfer electrical and/or mechanical forces configured to facilitate movement of trailer mover system 100 and/or an attached trailer. Control components 101C are coupled to structural components 101A and/or power components 101B, and are configured to enable operation and/or control of trailer mover system 100 by a user, as desired.

Figure 3A:
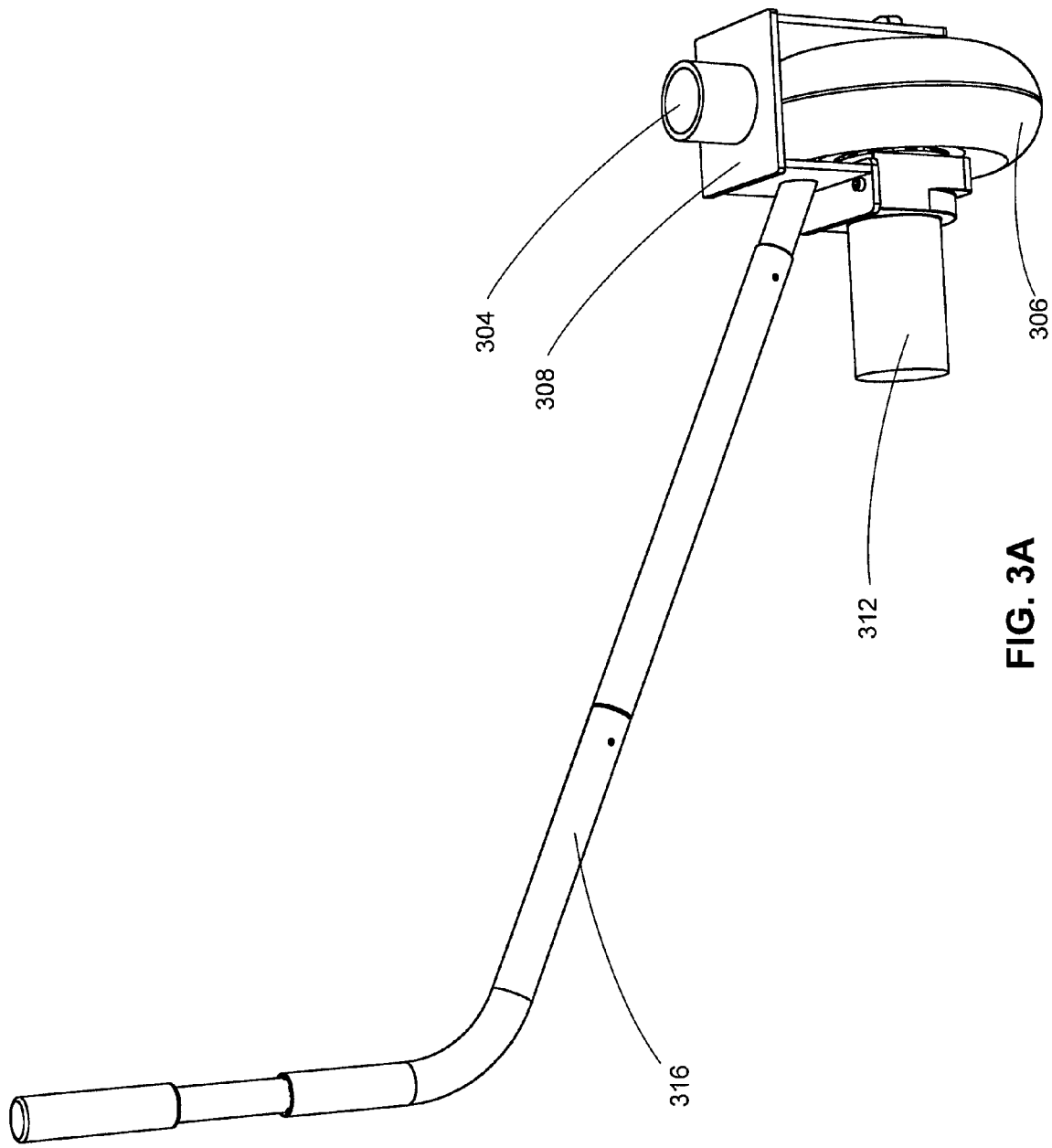
FIG. 3A illustrates a trailer mover system in accordance with an exemplary embodiment.
Figure 3B:
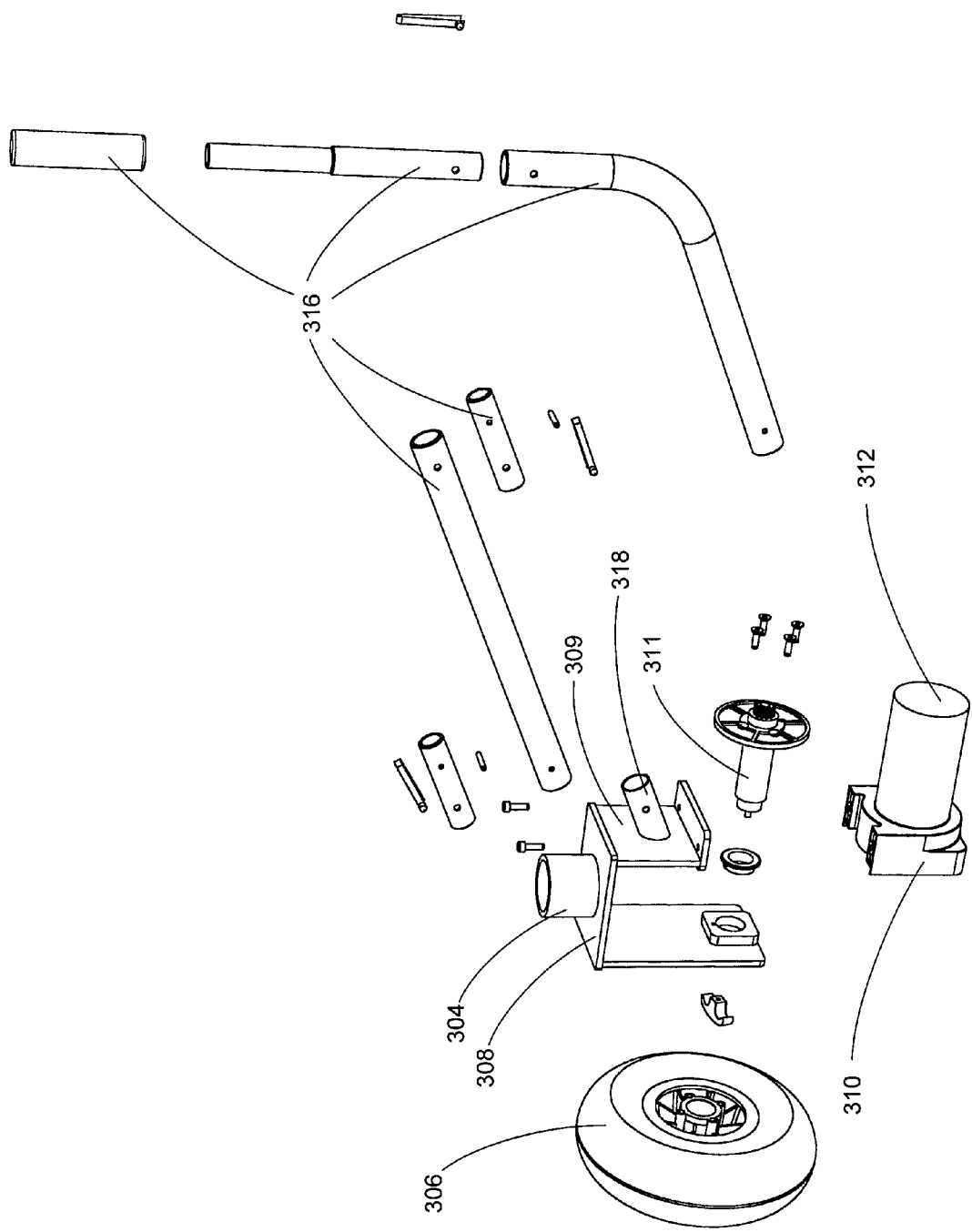
FIG. 3B illustrates an exploded view of a trailer mover system in accordance with an exemplary embodiment.

With reference now to FIGS. 3A-3B, in an exemplary embodiment, trailer mover system 100 comprises structural components 101A, for example wheel assembly 302 comprising wheel 306 and frame 308 configured with connecting unit 304. In this exemplary embodiment, trailer mover system 100 further comprises power components 101B, for example, gear reduction unit 310 and electric motor 312. In this exemplary embodiment, trailer mover system 100 further comprises control components 101C, for example steering handle 316.

In an exemplary embodiment, wheel assembly 302 is coupled to electric motor 312 via gear reduction unit 310. Steering handle 316 is coupled to wheel assembly 302 in order to facilitate control of and/or operation of trailer mover system 100 by a user. Various couplings within trailer mover system 100 utilize fasteners, bearings, bushings, and/or the like, as suitable to provide retaining forces and/or alleviate frictional losses and/or wear.

Figure 3C:
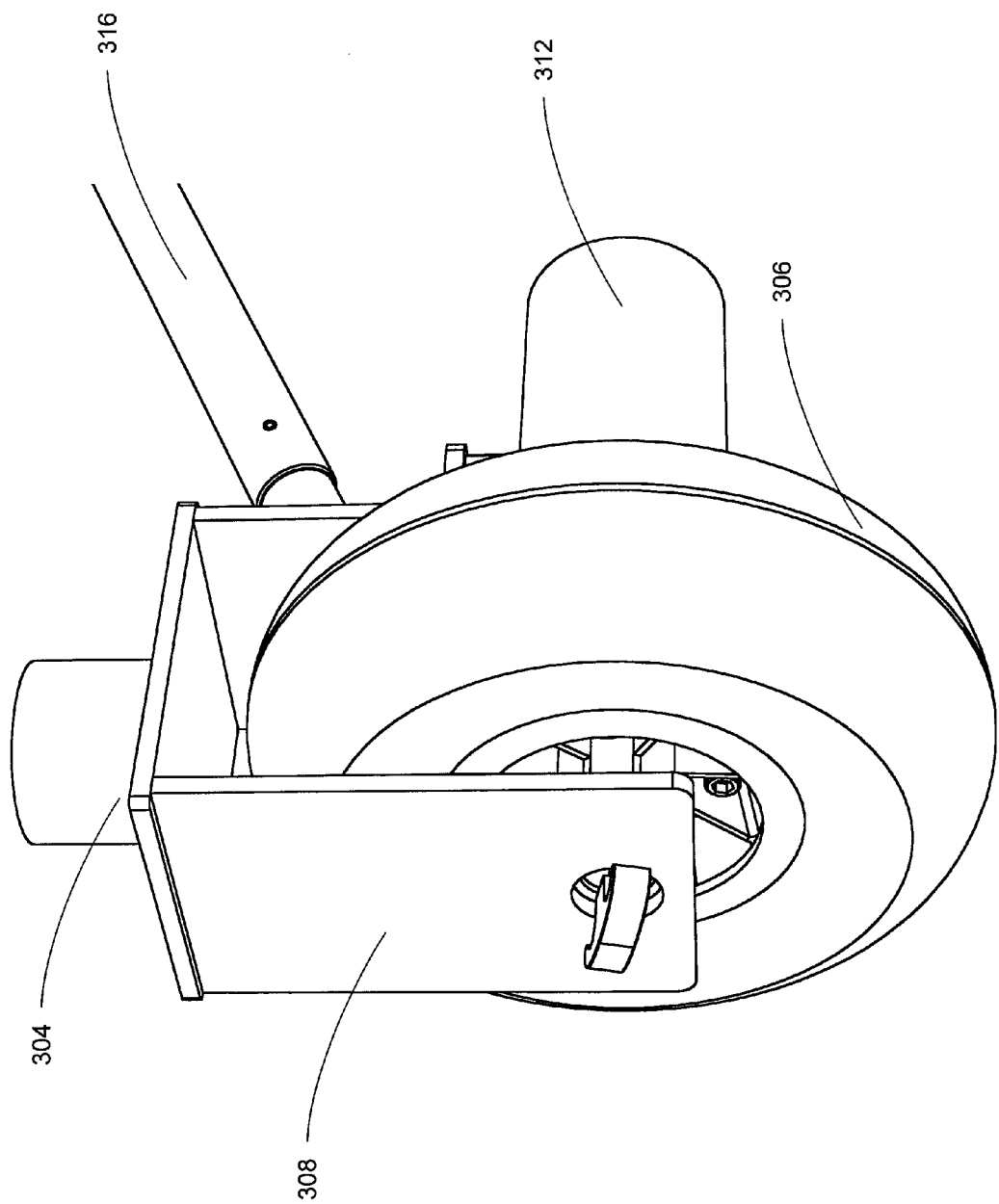
FIG. 3C illustrates a perspective view of a portion of a trailer mover system in accordance with an exemplary embodiment.
Figure 3D:
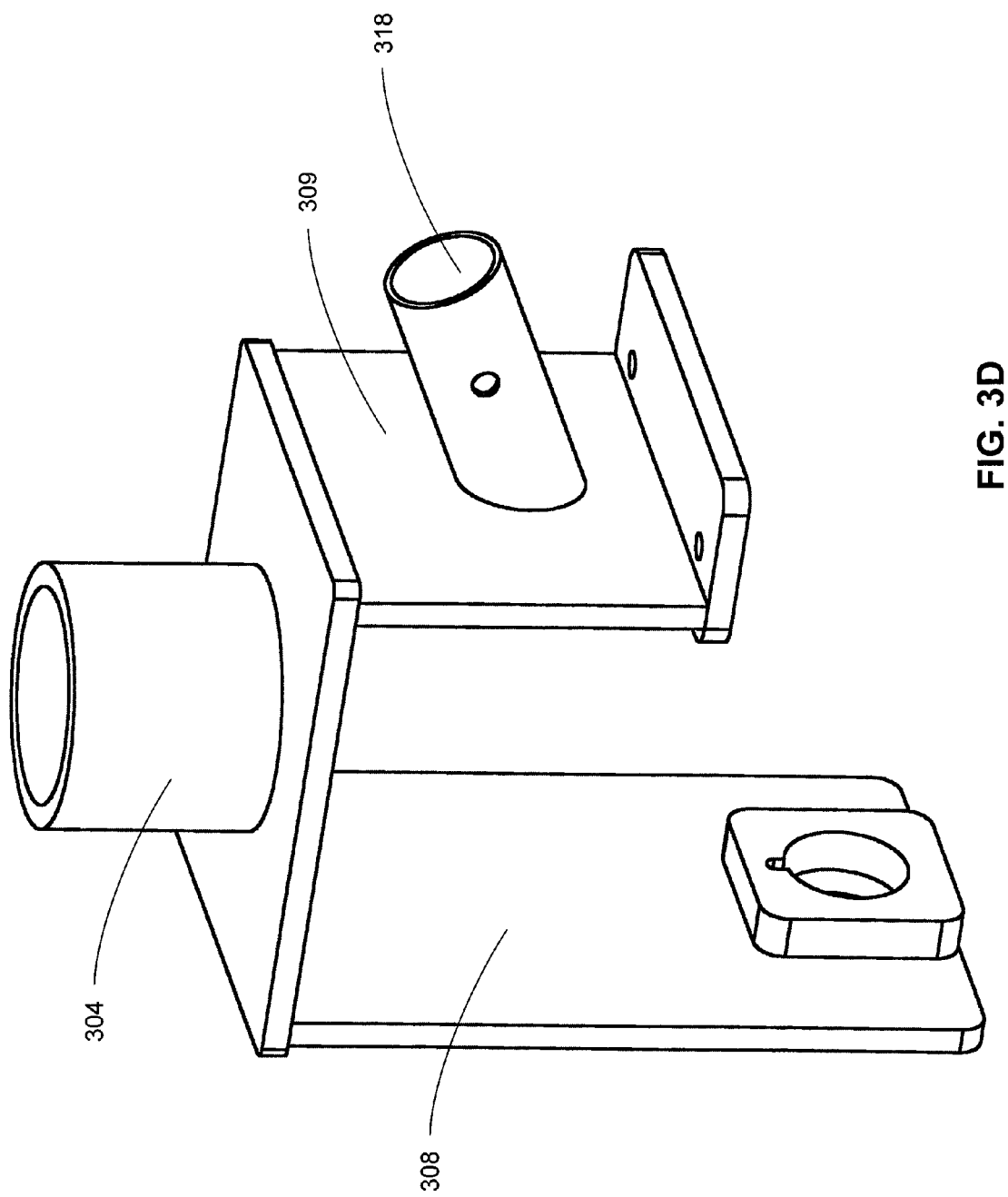
FIG. 3D illustrates a frame of a trailer mover system in accordance with an exemplary embodiment.

Wheel assembly 302 may comprise any suitable components, mechanisms, and/or devices configured to enable movement of a supported object across a surface. In an exemplary embodiment, with reference to FIGS. 3A-3C, wheel assembly 302 comprises a wheel 306 and a frame 308 configured to mount wheel 306. Wheel assembly 302 is configured to be rotatably disposed to a trailer, for example via coupling to a trailer stand. Wheel assembly 302 may also be configured to be pivotally connected to a connecting unit 304, which may be coupled to the base of a trailer stand. Wheel 306 is coupled to frame 308 in a manner configured to allow rotation of wheel 306 with respect to the ground, for example via an axle and bearings.

Wheel 306 may comprise any suitable components, materials, and or configurations, as desired. In an exemplary embodiment, wheel 306 comprises a standard rubber tire, for example a pneumatic rubber tire, mounted to a hub or rim. An axle 311 may be rigidly affixed to the hub or rim, for example via a retaining pin. Axle 311 may further comprise an external gear extending from the hub or rim to engage gear reduction unit 310. In certain exemplary embodiments, the external gear of axle 311 may directly engage electric motor 312.

With reference now to FIGS. 3A-3D, in various exemplary embodiments frame 308 may comprise any suitable components, mechanisms, structures, and/or devices configured to support wheel 306 and/or other components of trailer mover system 100. In an exemplary embodiment, frame 308 comprises steel plates welded together. In other exemplary embodiments, frame 308 may comprise aluminum, titanium, composite material, and/or the like, or combinations of the same.

In various exemplary embodiments, frame 308 may be configured with various flanges, cavities, extensions, mounting surfaces, and/or the like, in order to support and/or couple to other components of trailer mover system 100. In an exemplary embodiment, frame 308 is configured with a truncated arm 309 such that components configured to impart a force to wheel 306, for example an electric motor 312 and/or a gear reduction unit 310, may suitably access the hub of wheel 306. Frame 308 may be coupled to wheel 306 in any suitable manner.

Frame 308 may also comprise a surface configured to rotatably connect to a trailer stand and/or other portion of a wheeled vehicle. Alternatively, in certain exemplary embodiments, frame 308 is coupled to a connecting unit 304 configured to link frame 308 to a trailer stand and/or other portion of a wheeled vehicle. For example, connecting unit 304 may comprise a generally cylindrical extension configured for insertion at least partially into or around a portion of a trailer stand. Alternatively, an upper side of frame 308 may be configured with a protruding surface that is inserted at least partially into or around a portion of a trailer stand. In various exemplary embodiments, with momentary reference to FIG. 2, connecting unit 304 is configured to attach directly to the tongue of a trailer. In this configuration, a joint, pivot point, swivel, and/or any other suitable structure configured to facilitate steering, guidance, and/or rotation of wheel assembly 302 with respect to the trailer tongue may be located at any point along connecting unit 304 between the trailer tongue and frame 308, at the point of attachment of frame 308 and connection unit 304, and/or at any other suitable location, as desired.

In various exemplary embodiments, frame 308 is configured to locate wheel 306 centrally beneath connecting unit 304 and/or centrally beneath a desired portion of a wheeled vehicle, for example a trailer stand. Stated another way, frame 308 is configured to achieve a "zero offset axle" configuration. In other words, the vertical axis about which wheel 306 may rotate and the vertical axis about which steering handle 316 may rotate are collinear. Moreover, the horizontal rotation axis of wheel 306 about the wheel axle also intersects the vertical rotation axis of wheel 306. In this manner, wheel 306 may be rotated about the vertical axis with a minimized amount of force. Further, in this configuration, lateral forces operative on wheel 306 while being driven by motor 312 are reduced and/or minimized. Consequently, trailer mover system 100 may be operated in a suitable manner without requiring constant guidance and/or steering via steering handle 316, simplifying operation of trailer mover system 100 and improving user satisfaction.

With reference again to FIGS. 3A-3C and 3E, in certain exemplary embodiments, frame 308 is configured to be coupled to, support, and/or otherwise accommodate a power source (e.g., a battery or similar) for electric motor 312. For example, frame 308 may be configured in a manner facilitating placement of a battery in contact therewith, for example on an upper surface. In other exemplary embodiments, a power source that is part of an object intended to be moved (e.g., a trailer) may suitably be utilized, and frame 308 may be configured accordingly. Frame 308 is further connected to steering handle 316, for example via linkage 318.

Steering handle 316 may comprise any suitable components, tubes, devices, mechanisms, and/or the like configured to facilitate guidance, steering, and/or rotation of wheel assembly 302 and/or wheel 306. In an exemplary embodiment, steering handle 316 comprises a plurality of formed portions of metal pipe. In various exemplary embodiments, steering handle 316 is attached to frame 308, truncated arm 309, and/or to connecting unit 304. In this manner, wheel assembly 302 may be guided, steered, and/or rotated as desired, for example rotated up to 360° about a vertical axis. Steering handle 316 may be L-shaped, linear, curved, and/or otherwise configured and/or formatted to facilitate steering, guidance, and/or rotation of wheel assembly 302. Steering handle 316 may comprise aluminum, steel, plastic, and/or any suitable rigid or semi-rigid material, for example a metal pipe. Various electronic components, for example switches, indicators, wires, buttons, and/or the like, may be coupled to steering handle 316 and/or routed through steering handle 316 to couple with other components of trailer mover system 100. In this manner, various controls for operation of trailer mover system 100 may be located on steering handle 316. Steering handle 316 is coupled to wheel assembly 302 via linkage 318.

Linkage 318 may comprise any suitable component configured to couple wheel assembly 302 to steering handle 316. In an exemplary embodiment, linkage 318 comprises an expander-type or wedge-type nut configured to apply a frictional force to a portion of steering handle 316, for example responsive to rotation of a bolt. Linkage 318 may further be configured with a hinge or other adjustable mechanism in order to modify the orientation of steering handle 316 with respect to wheel assembly 302. In another exemplary embodiment, linkage 318 may comprise a generally cylindrical extension from frame 308 into which a portion of steering handle 316 may be disposed.

Figure 3E:
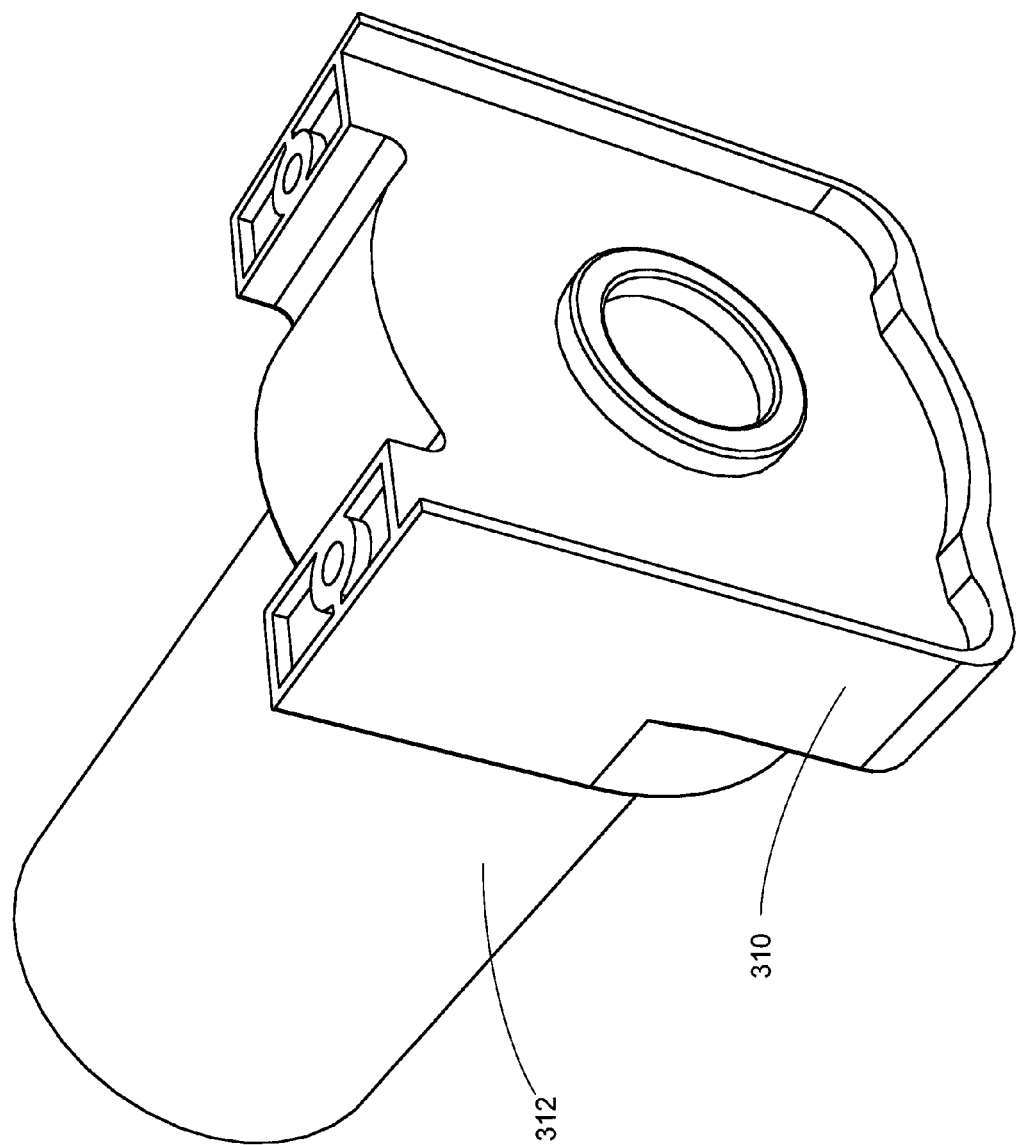
FIG. 3E illustrates a motor of a trailer mover system in accordance with an exemplary embodiment.
Figure 3F:
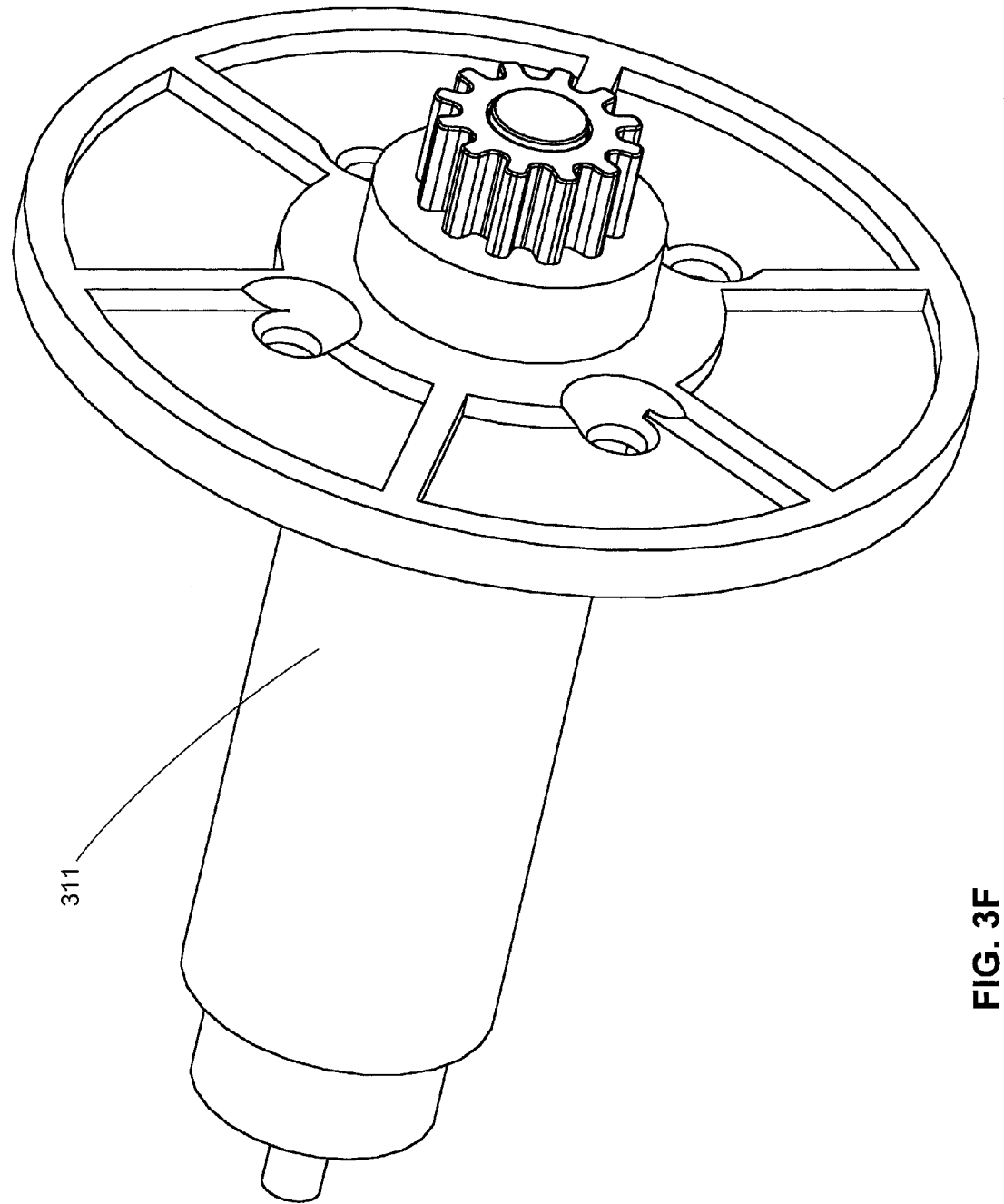
FIG. 3F illustrates an axle of a trailer mover system in accordance with an exemplary embodiment.

With reference now to FIGS. 3B and 3E, in an exemplary embodiment gear reduction unit 310 comprises any suitable components configured to transfer force from motor 312 to wheel 306, for example one or more mechanical gears. Gear reduction unit 310 may thus comprise various spur gears, helical gears, worm gears, bevel gears, crown gears, pinions, sprockets, idler gears, face gears, miter gears, planetary gears, and/or the like, as desired. In an exemplary embodiment, gear reduction unit 310 engages wheel 306 via axle 311 and a planetary gear system. Moreover, gear reduction unit 310 may be configured to provide a mechanical advantage to motor 312, allowing motor 312 to move a load larger than would be possible in the absence of gear reduction unit 310. Gear reduction unit 310 may be mounted to frame 308 of wheel assembly 302. Gear reduction unit 310 may also be directly coupled to and/or integral with electric motor 312. Moreover, gear reduction unit 310 may be located at any suitable location within trailer mover system 100, and gear reduction unit 310 may further comprise any suitable electronic and/or mechanical components, as desired.

In certain exemplary embodiments, gear reduction unit 310 comprises at least a portion of a planetary gear set. For example, a rotating shaft coupled to electric motor 312 may function as the sun gear of the planetary gear set, and a gear coupled to the hub of wheel 306 may function as the ring gear of the planetary gear set. One or more planetary gears and/or ring gears may be contained within gear reduction unit 310, as desired. Moreover, the planetary gear set and/or other components of trailer mover system 100 may be configured to provide an automatic braking functionality, for example when motor 312 is disengaged. Gear reduction unit 310 is coupled to frame 308 and/or to electric motor 312.

With continued reference to FIGS. 3B and 3E, in various exemplary embodiments, electric motor 112 comprises suitable components configured to generate mechanical force in order to move wheel 306. In an exemplary embodiment, electric motor 312 is a direct current (DC) motor, for example a permanent magnet motor capable of generating up to about 1.5 horsepower at 12 volts. Electric motor 312 may comprise any suitable motor, for example a brushless DC motor, a brushed DC motor, a coreless DC motor, an alternating current (AC) motor, a transverse flux motor, and/or the like. Moreover, any motor, actuator, or similar device presently known or adopted in the future to drive moving parts within trailer mover system 100 falls within the scope of the present disclosure. In various other exemplary embodiments, electric motor 312 may be replaced with another suitable power storage, generation, and/or delivery mechanism capable of moving wheel 306, for example an internal combustion engine, a spring, a piezoelectric material, and/or the like. Electric motor 312 is coupled to gear reduction unit 310 and/or frame 308.

Electric motor 312 may have a rotatable shaft configured to engage gear reduction unit 310. In various exemplary embodiments, electric motor 312 engages wheel 306 directly. Electric motor 312 may be configured to rotate the shaft in a clockwise or counterclockwise direction; alternatively, electric motor 312 may be configured to rotate the shaft in either direction. Electric motor 312 may be powered by any means sufficient to effectuate movement of wheel 306. For example, electric motor 312 may be powered by a 12V battery, e.g., an automotive battery, a trailer battery, and/or the like. Additionally, electric motor 312 may also also be coupled to one or more control components, for example a control panel 322 and/or an integrated control panel 324.

Figure 3G:
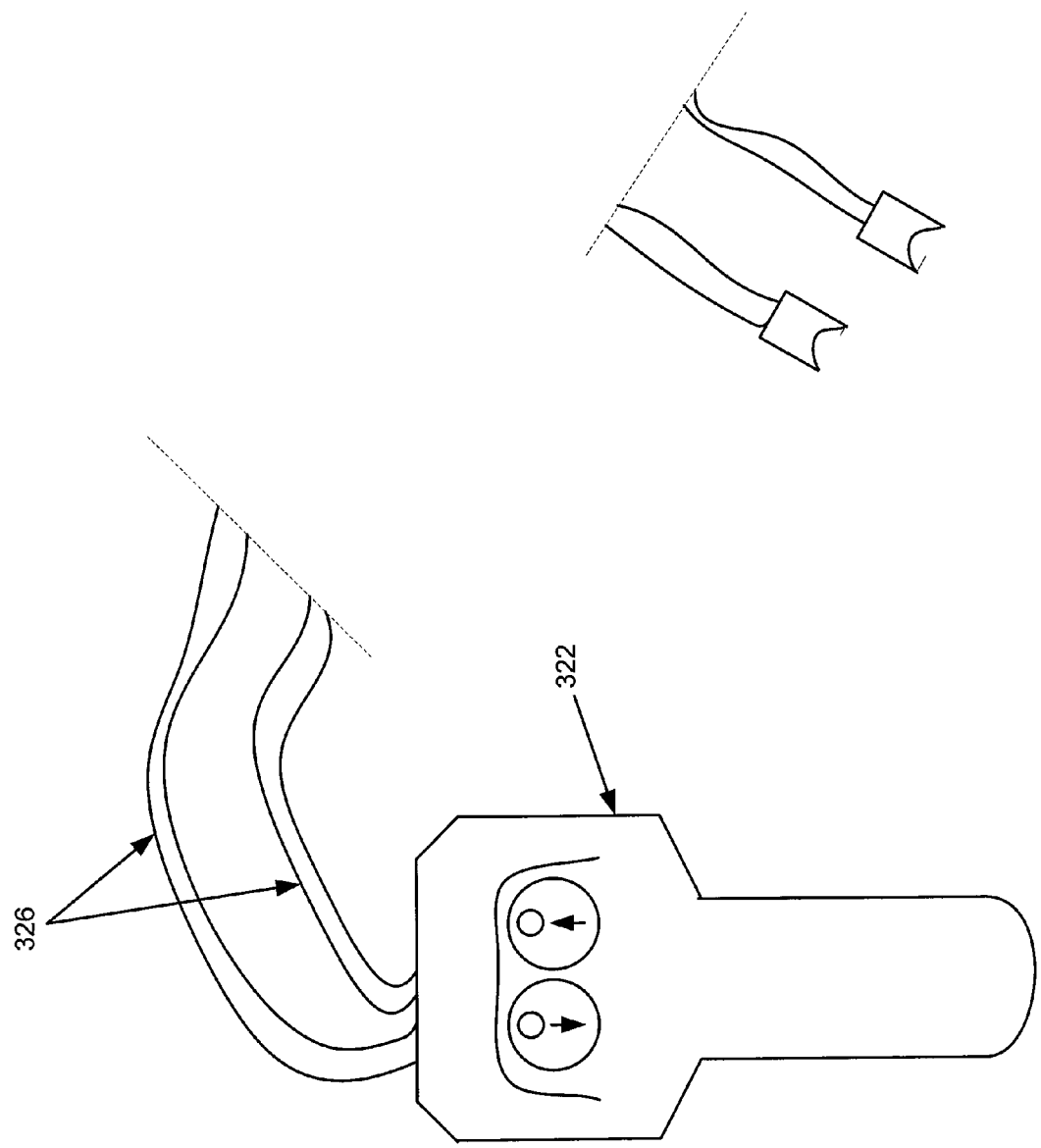
FIG. 3G illustrates a controller for a trailer mover system in accordance with an exemplary embodiment.

With reference now to FIG. 3G, in various exemplary embodiments trailer mover system 100 comprises a control panel 322. Control panel 322 may comprise any suitable electronic and/or mechanical components, for example dials, displays, switches, lights, indicators, inputs, circuits, chips, and/or the like, configured to facilitate control of motor 312 and/or other portions of trailer mover system 100, as desired. In an exemplary embodiment, control panel 322 comprises a molded plastic shell containing an integrated power relay and control button module. The control button module is configured with a first speed button configured to trigger operation of motor 312 at a first speed, and a second speed button configured to trigger operation of motor 312 in the opposite direction at a second speed different from the first speed. Control panel 322 further comprises load distributing relays configured to deliver electrical current to motor 312, and a circuit breaker configured to protect operational components of control panel 322 from excessive current.

Figure 3H:
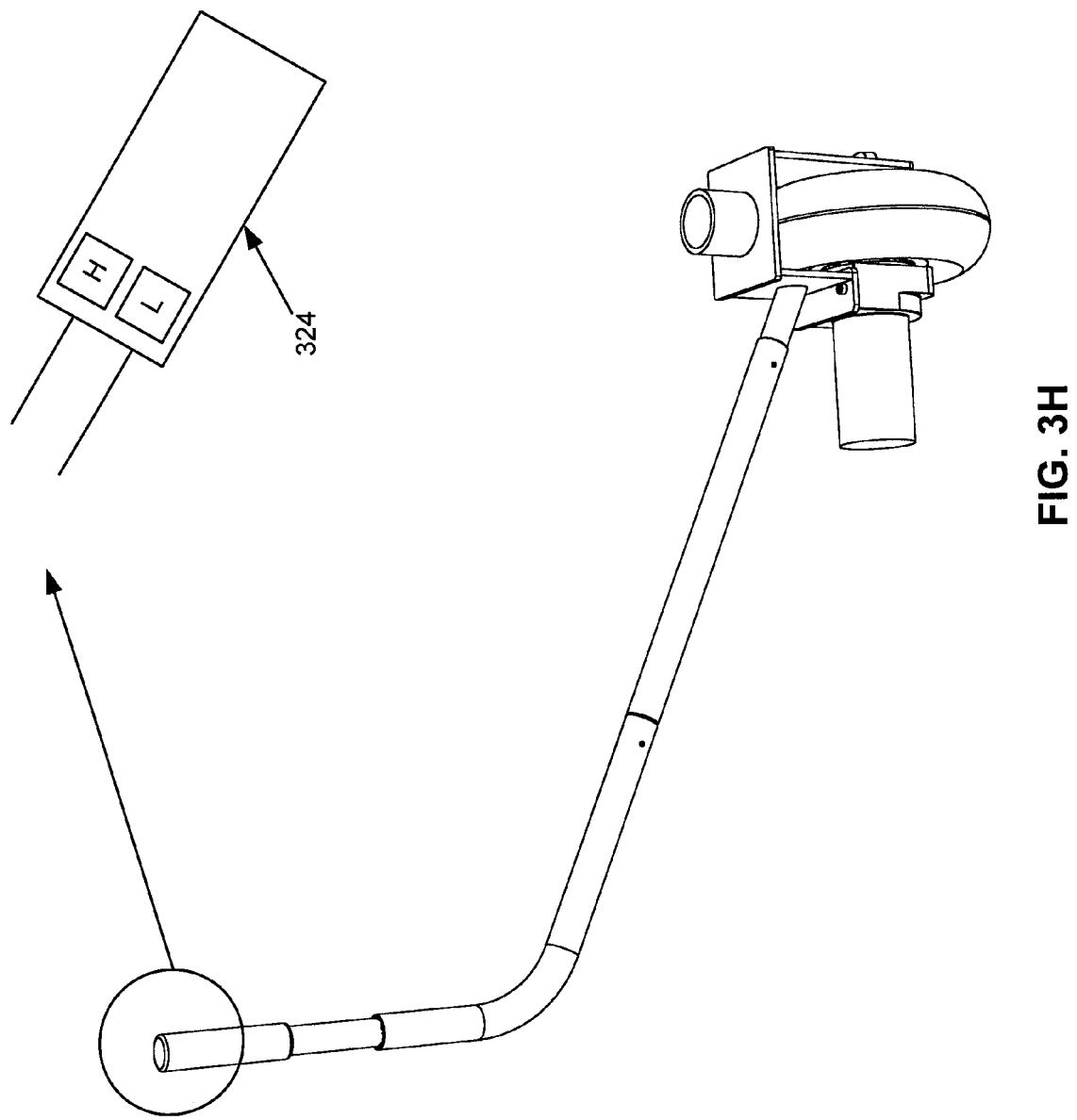
FIG. 3H illustrates a controller on a steering handle of a trailer mover system in accordance with an exemplary embodiment.

Control panel 322 may be coupled to electric motor 312 via any suitable means, for example via one or more electrical cables 326. In certain exemplary embodiments, power to drive electric motor 312 may also be supplied via cables 126. In these embodiments, one or more of cables 326 may be configured with grip-type leads (for example, spring-loaded leads as found on automotive jumper cables) in order to facilitate coupling with and/or decoupling from terminals of a battery. In other exemplary embodiments, cables 326 deliver control commands to motor 312, and power for motor 312 is delivered separately. In various exemplary embodiments, control panel 322 may be coupled to and/or integrated with steering handle 316 (e.g., as illustrated by integrated control panel 324 in FIG. 3H).

In various exemplary embodiments, control panel 322 may be coupled to and/or in communication with motor 312 and/or other components of trailer mover system 100 solely via wireless communication, for example via radio frequency signals or other suitable means. In an exemplary embodiment, control panel 322 may be configured as a compact wireless controller, for example a controller suitable for storage on a keychain or other portable location.

Control panel 322 may thus be configured with any suitable controls, options, settings, and/or the like, for example in order to facilitate control of motor 312. Control panel 322 may enable a user to turn electric motor 312 on and off, adjust the speed and/or power output of electric motor 312, adjust the operational direction of motor 312, and/or the like. Moreover, control panel 322 may comprise additional and/or fewer components and/or capabilities, as desired.

Figure 4:
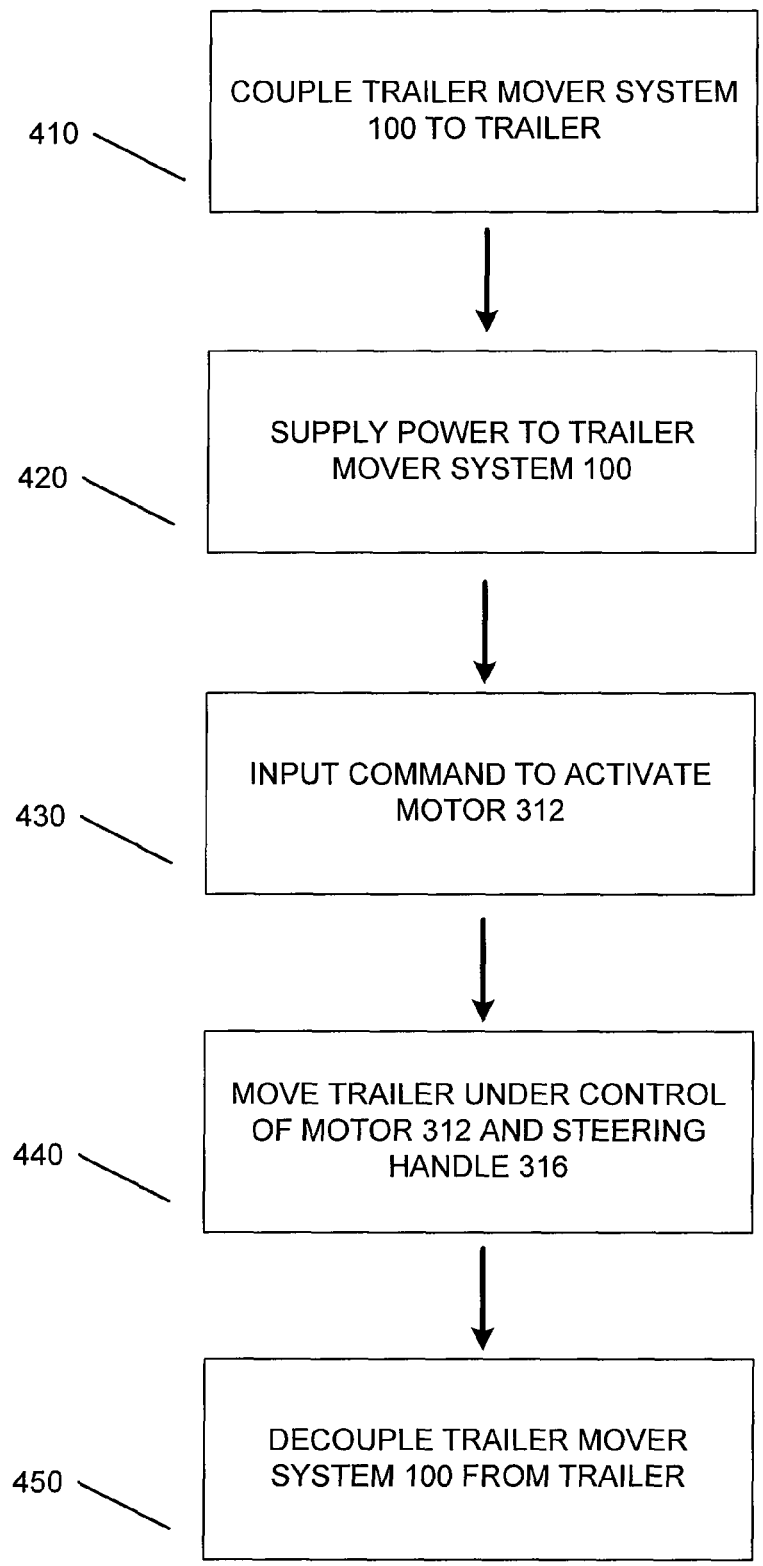
FIG. 4 illustrates a method of moving a trailer in accordance with an exemplary embodiment.

Turning now to FIG. 4, in certain exemplary embodiments, a trailer mover system 100 may be utilized to move a wheeled vehicle, as follows. Trailer mover system 100 is coupled to a wheeled vehicle such as a trailer, for example by connecting at least a portion of trailer mover system 100 to a trailer stand (step 410). Power is supplied to trailer mover system 100, for example by coupling cables 326 to a battery located on the trailer (step 420). Via use of control panel 322, a user issues one or more operational commands configured to activate motor 312 (step 430). Responsive to an operational command, motor 312 generates force to cause wheel 306 to rotate, resulting in movement of the trailer. The user may steer, guide, and or otherwise control movement of the trailer and/or operation of trailer mover system 100 via use of one or more of steering handle 316, control panel 322, and/or the like (step 440). When the trailer reaches a desired location, trailer mover system 100 may be decoupled from the trailer and/or a power source, as desired (step 450). Alternatively, trailer mover system 100 may be decoupled from a trailer without separating trailer mover system 100 from a power source. Trailer mover system 100 may be repeatedly coupled to, operated, and removed from a trailer, as desired.

In various exemplary embodiments, trailer mover system 100 is configured to move and/or to be integrated with a suitable wheeled object. For example, trailer mover system 100 may be configured to couple to, move, and/or be integrated with a wheelbarrow. Trailer mover system 100 may also be configured to move a portable electrical apparatus, for example a generator. Moreover, trailer mover system 100 may be configured to move any suitable object, for example a tool chest, an item of medical equipment, a portable retail kiosk, a gate, a fence, a portion of irrigation piping, a flatbed transport cart, and/or the like.

In various exemplary embodiments, trailer mover system 100 may be configured to be lightweight and/or compact. In an exemplary embodiment, trailer mover system 100 weighs between about 15 pounds and about 40 pounds.

Moreover, in various exemplary embodiments, multiple trailer mover systems 100 may be coupled to an object, as desired, in order to facilitate movement of the object. For example, a first trailer mover system 100 may be coupled to an object at a first location, and a second trailer mover system 100 may be coupled to an object at a second location. Movement of the object is thus accomplished via use of multiple trailer mover systems 100. In these exemplary embodiments, multiple trailer mover systems 100 may operate under the control of a single controller. Additionally, multiple objects may be coupled to a single trailer mover system 100 and the multiple objects may be moved accordingly.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., various of the steps may be deleted, modified, or combined with other steps. Additionally, various components of trailer mover system 100 may link directly to other components and/or be omitted, as desired. These and other changes or modifications are intended to be included within the scope of the following claims.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The foregoing specification has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all of the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An object mover system, comprising:
   at least one wheel coupled to a frame, wherein the frame comprises:
      a horizontal steel plate;
      a first sidewall extending downward from the horizontal steel plate, the first sidewall having an opening receiving a bearing and an axle;
      a trailer connecting unit disposed on the top of the horizontal steel plate, the trailer connecting unit rotatable with respect to the frame;
      a truncated arm extending downward from the horizontal steel plate, the truncated arm coupled to a motor; and
      a linkage extending upward at an angle from the truncated arm, the linkage receiving a portion of a steering handle;
   the motor coupled to the at least one wheel via a planetary gear system;
   the steering handle coupled to the frame, wherein the steering handle enables steering of the at least one wheel; and
   a control panel coupled to the motor, wherein the control panel activates the motor responsive to input at the control panel.

2. The system of claim 1, wherein the planetary gear system operates as a brake responsive to deactivation of the motor.

3. The system of claim 2, wherein the control panel is removably coupled to the motor.

4. The system of claim 1, further comprising a battery coupled to the motor.

5. The system of claim 1, wherein the system is configured to move an object having a weight of less than 3000 pounds.

6. The system of claim 1 wherein the axle does not pass through the truncated arm.

7. The system of claim 1, wherein the trailer connecting unit comprises a cylindrical extension configured to receive a portion of a trailer stand.

8. The system of claim 7, wherein the object mover system is configured with a zero offset axle configuration.

9. The system of claim 8, wherein the axis of rotation of the wheel is rotatable through 360 degrees, and wherein the axis of rotation of the wheel is rotatable through at least 180 degrees via operation of the steering handle when the trailer connecting unit is coupled to a trailer.

10. The system of claim 9, wherein the axis of rotation of the motor and the axis of rotation of the frame with respect to the connecting unit intersect at the center of the wheel.

11. A method for moving a trailer, the method comprising:
   coupling a wheel to the tongue of the trailer, the wheel being coupled to a motor via a planetary gear system, wherein the wheel is coupled to a frame comprising:
      a horizontal steel plate;
      a first sidewall extending downward from the horizontal steel plate, the first sidewall having an opening receiving a bearing and an axle;
      a trailer connecting unit disposed on the top of the horizontal steel plate, the trailer connecting unit rotatable with respect to the frame;
      a truncated arm extending downward from the horizontal steel plate, the truncated arm coupled to the motor; and
      a linkage extending upward at an angle from the truncated arm, the linkage receiving a portion of a steering handle;
   coupling the motor to a power source located on the trailer;
   delivering, via a control panel coupled to the motor, at least one operational command to the motor to cause the motor to operate and move the trailer: and
   providing guidance to the trailer while the motor is operational via use of the steering handle coupled to the wheel.

12. The method of claim 11, further comprising decoupling the wheel from the tongue of the trailer.

13. The method of claim 12, further comprising decoupling the control panel from the motor.

14. The method of claim 13, wherein the control panel comprises a first speed switch and a second speed switch.

15. The method of claim 11, wherein the control panel is wirelessly coupled to the motor.

16. The method of claim 15, further comprising deactivating the motor, via the wireless control panel, to cause the trailer to come to a stop.

17. The method of claim 11, wherein the providing guidance to the trailer comprises steering the trailer into a location inaccessible to the trailer when the trailer is coupled to a tow hitch of a vehicle.

18. The method of claim 11, wherein the providing guidance to the trailer comprises steering the trailer while the trailer is in a location inaccessible to a tow vehicle.

19. The method of claim 11, wherein the steering handle is coupled to the truncated arm at a location between the trailer connecting unit and the ground, and wherein the steering handle is rotatable through at least 180 degrees with respect to the trailer during the time the steering handle provides guidance to the motor.

20. The method of claim 11, wherein the axle does not pass through the truncated arm.

* * * * *